(12) United States Patent
Jung

(10) Patent No.: US 9,092,032 B2
(45) Date of Patent: Jul. 28, 2015

(54) FLOW CONTROL VALVE

(71) Applicant: Korea Aerospace Research Institute, Daejeon (KR)

(72) Inventor: Tae Kyu Jung, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 329 days.

(21) Appl. No.: 13/663,696

(22) Filed: Oct. 30, 2012

(65) Prior Publication Data

US 2013/0105007 A1     May 2, 2013

(30) Foreign Application Priority Data

Oct. 31, 2011 (KR) .................. 10-2011-0111891

(51) Int. Cl.
    *G05D 7/01*            (2006.01)

(52) U.S. Cl.
    CPC ............. *G05D 7/014* (2013.01); *Y10T 137/776* (2015.04); *Y10T 137/7768* (2015.04)

(58) Field of Classification Search
    CPC ............. G05D 7/014; Y10T 137/7768; Y10T 137/776
    USPC ............................................. 137/501, 505.13
    See application file for complete search history.

(56) References Cited

U.S. PATENT DOCUMENTS

| | | | | |
|---|---|---|---|---|
| 1,967,981 A | * | 7/1934 | Thomas | 137/496 |
| 2,134,778 A | * | 11/1938 | Clarke | 184/104.1 |
| 2,498,194 A | * | 2/1950 | Arthur | 236/92 R |
| 2,514,514 A | * | 7/1950 | Puster | 137/501 |
| 2,646,060 A | * | 7/1953 | Ponsar | 137/115.1 |
| 2,951,501 A | * | 9/1960 | Thylefors | 137/501 |
| 2,969,640 A | * | 1/1961 | Reed | 60/242 |
| 3,282,323 A | * | 11/1966 | Heitmann et al. | 60/39.281 |
| 3,643,685 A | * | 2/1972 | Hays | 137/501 |
| 3,809,111 A | * | 5/1974 | Olsson | 137/503 |
| 5,971,012 A | * | 10/1999 | Skoglund | 137/501 |

* cited by examiner

*Primary Examiner* — William McCalister
(74) *Attorney, Agent, or Firm* — Hammer & Associates, P.C.

(57) ABSTRACT

Provided is a flow control valve including a valve body including a flow path, a first poppet fixed in the valve body including an inlet through which a fluid flows in, and an outflow hole through which the fluid flows out to the flow path of the valve body, a second poppet fixed in the valve body including an outlet through which the fluid flows out, and an inflow hole through which the fluid flows in from the flow path of the valve body, a sleeve to adjust an area of the outflow hole, a spool formed to slide along an external surface of the second poppet, and bellows of which one end is coupled with the first poppet and the other end is coupled with the spool.

5 Claims, 4 Drawing Sheets

FLOW CONTROL VALVE

CROSS-REFERENCE TO RELATED APPLICATION

This application claims the benefit of Korean Patent Application No. 10-2011-0111891, filed on Oct. 31, 2011, in the Korean Intellectual Property Office, the disclosure of which is incorporated herein by reference.

BACKGROUND

1. Field of the Invention

The present invention relates to a flow control valve, and more particularly, to a pressure-compensated flow control valve that may control a flow, and may maintain a flow to be constant by compensating for a pressure autonomously in response to a rapid change in a pressure at an entrance and exit of the valve.

2. Description of the Related Art

In general, a flow control valve is widely used in machinery utilized in all industries, for example, chemical engineering plants, power plants, vessels, aircraft, rocket engines, and the like.

A liquid propellant rocket engine refers to a flying device that obtains propulsion using the principle of action and reaction, by burning a mixture of a liquid fuel and an oxidizer in a combustion chamber, and expelling exhaust gases through a nozzle. Since the propulsion of the liquid propellant rocket engine may be adjusted readily through a valve and a pump, such a liquid propellant rocket engine is preferred over a solid propellant rocket engine. In order to adjust the propulsion of the liquid propellant rocket engine, a flow of the oxidizer and the fuel supplied to the combustion chamber may be adjusted and thus, a flow control valve may be required.

In addition, when the flow control valve is used for ground equipment, and the like, an increase in weight may be unproblematic. However, in a case of a vessel, aircraft, rocket, and the like, fuel efficiency may decrease as a weight increases. Accordingly, the lighter the valve is, the greater the fuel efficiency.

FIG. 1 is a cross-sectional view illustrating a flow control valve 1 according to a conventional art.

Referring to FIG. 1, the flow control valve 1 may include a valve body 10, a first poppet 20, a second poppet 30, a sleeve 40, a spool 50, and a guide bar 60. The valve body 10 may include a flow path 11. The first poppet 20 may be fixed in the valve body 10. An inlet 21 through which a fluid flows in may be formed on one side of the first poppet 20. The first poppet 20 may include an outflow hole 22 through which the fluid flows out to the flow path 11 of the valve body 10. The second poppet 30 may include an inflow hole 32 through which the fluid flows in from the flow path 11 of the valve body 10. The second poppet 30 may include an outlet 31 through which the fluid flows out, on the other side of the first poppet 20. The sleeve 40 may adjust an area of the outflow hole 22 by covering the outflow hole 22 of the first poppet 20 while sliding along an external surface of the first poppet 20 by an actuator. The spool 50 may be formed between the first poppet 20 and the second poppet 30 to slide along an external surface of the first poppet 20 and the second poppet 30. The spool 50 may be elastically supported by the second poppet 30. The spool 50 may adjust an area of the inflow hole 32 by covering the inflow hole 32 of the second poppet 30 while sliding by a pressure of the fluid flowing in the first poppet 20. The guide bar 60 may guide the spool 50 that slides.

The flow control valve 1 may adjust the area of the outflow hole 22, by covering a portion of the outflow hole 22 of the first poppet 20 while the sleeve 40 slides. In addition, although a pressure at an entrance or exit changes rapidly, the flow may be maintained to be constant at all times, by adjusting the area of the inflow hole 32 of the second poppet 30 by the spool 50.

However, since the conventional flow control valve 1 may need to be processed such that central axes of three parts, that is, the first poppet 20, the second poppet 30, and the spool 50, are aligned with one another exactly, manufacturing the flow control value 1 may be difficult. In particular, it may be difficult to process the spool 50 such that a sealing is guaranteed by maintaining an extremely small gap while the spool 50 moves smoothly along surfaces being in contact with the first poppet 20, the second poppet 30, and the guide bar 60.

SUMMARY

An aspect of the present invention provides a flow control valve that may be manufactured readily to control a flow of the valve precisely.

According to an aspect of the present invention, there is provided a pressure-compensated flow control valve including a valve body including a flow path, a first poppet fixed in the valve body, the first poppet including, on one side, an inlet through which a fluid flows in, and an outflow hole through which the fluid flows out to the flow path of the valve body, a second poppet fixed in the valve body, the second poppet including, on one side, an outlet through which the fluid flows out, and an inflow hole through which the fluid flows in from the flow path of the valve body, a sleeve to adjust an area of the outflow hole by covering the outflow hole of the first poppet while sliding along an external surface of the first poppet by an actuator, a spool formed to slide along an external surface of the second poppet, the spool being elastically supported by the second poppet, and bellows of which one end is coupled with the first poppet and the other end is coupled with the spool, the bellows expanding and contracting based on a change in an internal or external pressure. Here, the spool may adjust an area of the inflow hole by covering the inflow hole of the second poppet while sliding when the bellows expands and contracts

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
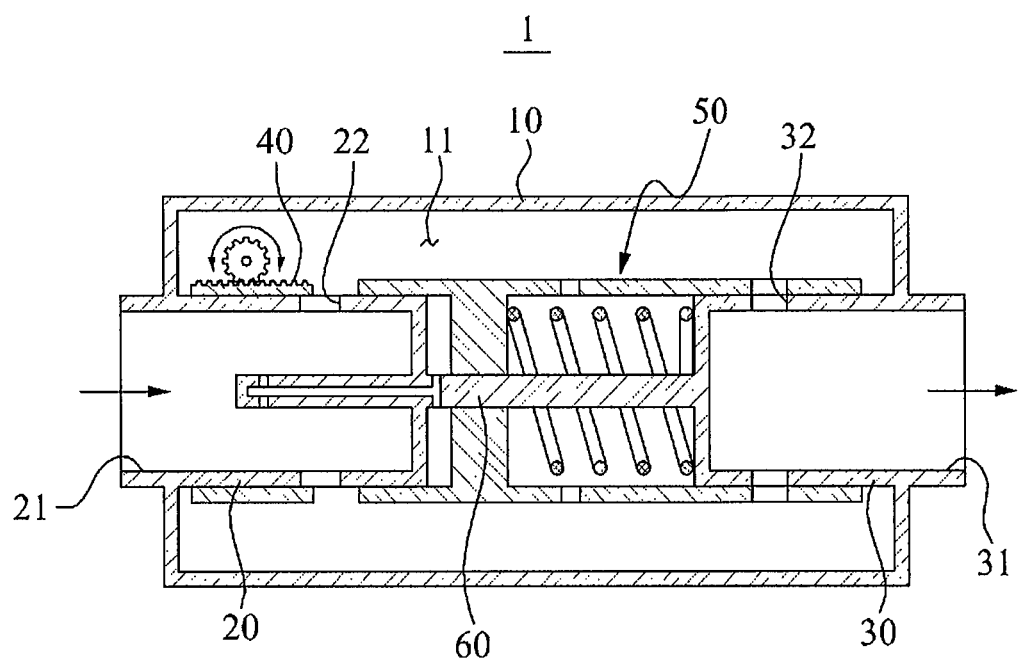
FIG. 1 is a cross-sectional view illustrating a flow control valve according to a conventional art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a flow control valve according to exemplary embodiments of the present invention will be described in detail with reference to FIGS. 2 through 4.

Figure 2:
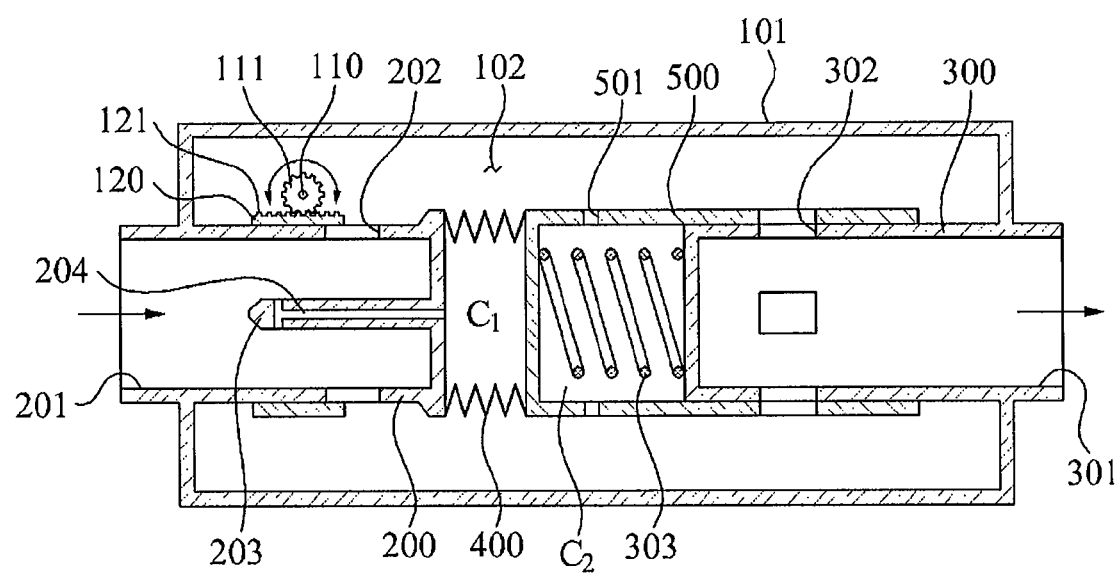
FIG. 2 is a cross-sectional view illustrating a flow control valve according to an embodiment of the present invention.

FIG. 2 is a cross-sectional view illustrating a flow control valve 2 according to an embodiment of the present invention.

Referring to FIG. 2, the flow control valve 2 may include a valve body 101, a first poppet 200, a second poppet 300, a sleeve 120, a spool 500, and bellows 400.

The valve body 101 may form a shape of the flow control valve 2. For example, the valve body 101 may be provided in a cylindrical form. A flow path 102 may be formed in an internal portion of the valve body 101 to provide a space in which a fluid flows. The first poppet 200, the second poppet 300, the bellows 400, and the like may be disposed in a central portion of the valve body 101. The flow path 102 may be disposed to surround the center of the internal portion of the valve body 101. The flow path 102 may be formed in a space between an internal surface of the valve body 101 and external surfaces of the first poppet 200 and the second poppet 300.

The first poppet 200 may be fixed in the valve body 101. An inlet 201 through which the fluid flows in may be formed at one end of the first poppet 200. An outflow hole 202 through which the fluid having flowed in through the inlet 201 flows out to the flow path 102 of the valve body 101 may be formed on a side surface of the first poppet 200. Outflow holes 202 may be disposed to face each other in the first poppet 200.

A pressure sensing pole 203 extending toward the inlet 201 may be formed at the other end of the first poppet 200. The pressure sensing pole 203 may be formed at the center of the other end of the first poppet 200 so as to protrude toward the inlet 201 while parallel to the side surface of the first poppet 200. The pressure sensing pole 203 may transfer a pressure of the fluid flowing in through the inlet 201 to a first chamber C1 surrounded by the bellows 400.

The pressure sensing pole 203 may include a minute flow path 204 through which the fluid flows. The minute flow path 204 may provide pressure communication between the inlet 201 and the first chamber C1. The first chamber C1 will be described later.

The second poppet 300 may be fixed in the valve body 101. An outlet 301 through which the fluid flows out may be formed at one end of the second poppet 300. An inflow hole 302 through which the fluid flows in from the flow path 102 of the valve body 101 may be formed on a side surface of the second poppet 300. Inflow holes 302 may be disposed to face each other in the second poppet 300

The sleeve 120 may be formed to surround the external surface of the first poppet 200 completely. The sleeve 120 may slide along the external surface of the first poppet 200, by an actuator. The sleeve 120 may adjust an area of the outflow hole 202 by covering a portion of the outflow hole 202.

That is, in order to enable a relatively great amount of the fluid to flow through the flow path 102, a position of the sleeve 120 may be adjusted such that the outflow hole 202 is narrowly covered by the sleeve 120. Conversely, in order to enable a relatively small amount of the fluid to flow through the flow path 102, the position of the sleeve 120 may be adjusted such that a large portion of the outflow hole 202 is covered by the sleeve 120.

A rack gear 121 may be formed on a surface of the sleeve 120. The actuator may correspond to a pinion gear 111 that is rotated by a drive shaft 110 while the pinion gear 111 is engaged with the rack gear 121.

An actuator may be operated by various schemes, for example, an electric motor scheme, a pneumatic scheme, a hydraulic scheme, and the like. A direct current (DC) motor may be used for precise control. In particular, the pinion gear 111 may be connected to the drive shaft 110 to be rotated. The drive shaft 110 may be connected to the DC motor to control the sleeve 120 precisely.

In addition, the actuator may include a gear box (not shown) including a plurality of gears to control the sleeve 120 precisely.

The bellows 400 may be formed between the other end of the first poppet 200 and the spool 500. The bellows 400 may include pleats on an external surface of the bellows 400. A length of the bellows 400 may be increased or decreased based on its elasticity and pressure difference between the first chamber C1 and a second chamber C2.

That is, the bellows 400 may expand and contract based on a change in an internal or external pressure of the bellows 400.

Since the bellows 400 may connect the first poppet 200 to the spool 500, aligning central axes of the first poppet 200 and the spool 500 exactly may be unnecessary. Accordingly, the flow control valve 2 may be manufactured with relative ease The first chamber C1 may be formed in an internal portion of the bellows 400. The first chamber C1 may be formed between the first poppet 200 and the spool 500. The first chamber C1 may share pressure communication with the inlet 201 through the minute flow path 204. An entrance of the minute flow path 204 may be formed on one side of the pressure sensing pole 203, and an exit of the minute flow path 204 may be formed on the other side of the pressure sensing pole 203. The exit of the minute flow path 204 may be connected to the first chamber C1.

The spool 500 may be formed to slide along an external surface of the second poppet 300. The spool 500 may be elastically supported by the second poppet 300. The spool 500 may be provided in a form of a pipe of which one side is opened. The second poppet 300 may be inserted into the opened side of the spool 500.

The second chamber C2 may be formed between the second poppet 300 and the spool 500. A spring 303 may be installed in an internal portion of the second chamber C2 to elastically support the spool 500. The spool 500 may include a spool hole 501 that shares pressure communication with the second chamber C2 and the flow path 102 of the valve body 101. The spool hole 501 may allow the fluid to flow in or out between the second chamber C2 and the flow path 102 when the spool 500 slides.

The second chamber C2 may be formed by an internal surface of the spool 500 and the other end of the second poppet 300. The other end of the second poppet 300 may be inserted into the spool 500. One end of the spring 303 installed in the second chamber C2 may be supported by the second poppet 300, and the other end of the spring 303 may be supported by the spool 500.

An operation of a pressure-compensated flow control valve configured according to the present embodiment will be described with reference to FIGS. 3 and 4.

A fluid flows in through the inlet 201 of the first poppet 200 may be released through the outlet 301 of the second poppet 300. That is, the fluid may flow into the flow path 102 of the valve body 101 through the outflow hole 202 of the first poppet 200. The fluid in the flow path 102 may flow out to the second poppet 300 through the inflow hole 302 of the second poppet 300. In addition, the fluid in the first poppet 200 may flow into the first chamber C1 through the minute flow path 204.

Hereinafter, an operating method of the flow control valve will be described.

Figure 3:
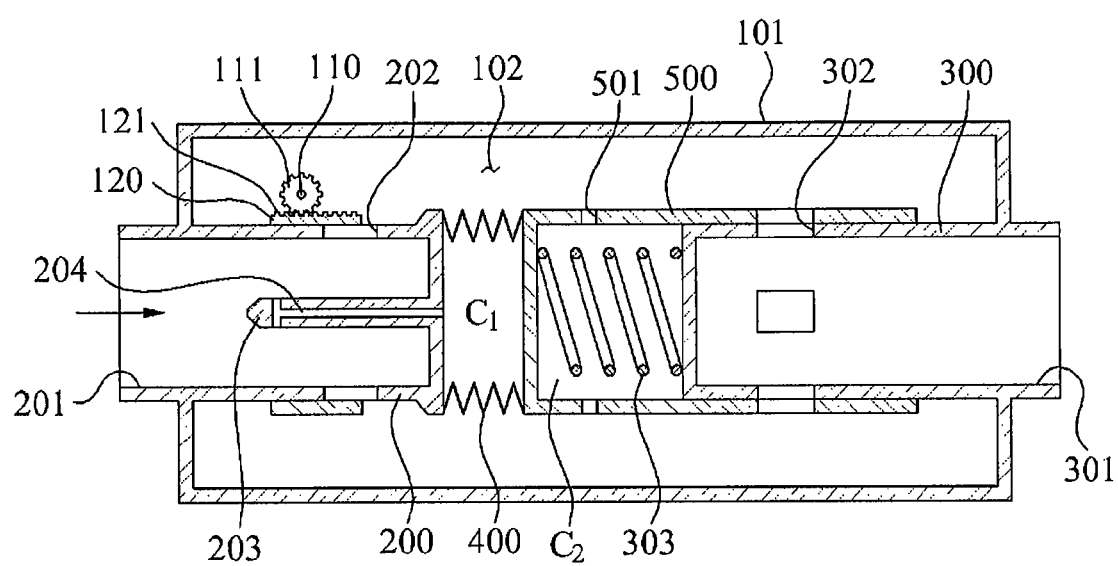
FIG. 3 is a cross-sectional view illustrating a sliding operation of a sleeve of a flow control valve according to an embodiment of the present invention.

FIG. 3 is a cross-sectional view illustrating a sliding operation of a sleeve of a flow control valve according to an embodiment of the present invention.

Referring to FIG. 3, the sleeve 120 may cover the outflow hole 202 of the first poppet 200 to adjust a flow of a fluid flowing from the first poppet 200 to the flow path 102 of the valve body 101.

In particular, the rack gear 121 formed on one side of the sleeve 120 may be engaged with the pinion gear 111. When the pinion gear 111 is rotated, the sleeve 120 may slide along an external surface of the first poppet 200. When the sleeve 120 slides, the sleeve 120 may cover a portion of the outflow hole 202 of the first poppet 200, thereby adjusting an area of the outflow hole 202.

When the sleeve 120 slides, the area of the outflow hole 202 of the first poppet 200 may be adjusted. When the sleeve 120 covers a relatively small area of the outflow hole 202, an opened area of the outflow hole 202 may increase and thus, an amount of the fluid flowing into the flow path 102 of the flow control valve 2 may increase. Conversely, when the sleeve 120 covers a relatively large area of the outflow hole 202, the opened area of the outflow hole 202 may decrease and thus, the amount of the fluid flowing into the flow path 102 of the flow control valve 2 may decrease.

An actuator that rotates the pinion gear 111 may be configured using a DC motor. The sleeve 120 may be controlled precisely using the DC motor. Accordingly, the flow of the fluid flowing into the flow path 102 of the flow control valve 2 may be controlled precisely.

Figure 4:
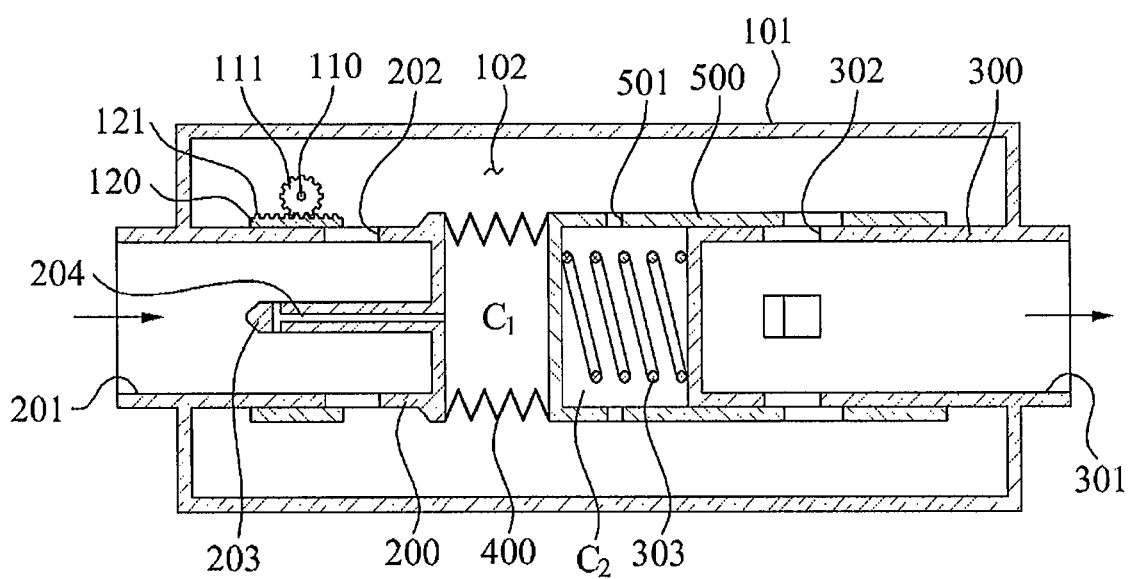
FIG. 4 is a cross-sectional view illustrating an operation when a high pressure is suddenly applied to an inlet of a first poppet of a flow control valve by disturbance.

FIG. 4 is a cross-sectional view illustrating an operation when a high pressure is suddenly applied to an inlet of a first poppet of a flow control valve by disturbance.

Referring to FIG. 4, when a pressure of a fluid flowing in through the inlet 201 of the first poppet 200 increases, the fluid may flow into the first chamber C1 through the minute flow path 204 of the pressure sensing pole 203.

Accordingly, an internal pressure of the first chamber C1 may increase, a volume of the first chamber may increase, a length of the bellows 400 may increase, and the bellows 400 may push the spool 500 in a direction of the outlet 301.

The spool 500 may cover a portion of the inflow hole 302 while being moved in the direction of the outlet 301, thereby maintaining an amount of the fluid that flows out through the outlet 301 to be constant.

When the pressure at the inlet 201 of the first poppet 200 increases, an amount of the fluid flows out to the flow path 102 of the valve body 101 through the outflow hole 202 of the first poppet 200 may increase. However, since the opened area of the inflow hole 203 may decrease when the inflow hole 302 is covered by the spool 500 sliding, the amount of the fluid passing through the inflow hole 302 of the second poppet 300 may be maintained to be constant. Accordingly, although the pressure at the inlet 201 of the flow control valve 2 increases suddenly, a constant amount of the fluid may flow through the flow control valve 2 at all times.

A degree of opening the inflow hole 302 of the second poppet 300 may be determined at a point where the forces acting on the spool 500, based on the pressure of the first chamber C1, the pressure of the second chamber C2, the elasticity of the spring 303 and the bellows 400, are balanced.

In contrast, when the pressure of the fluid flowing into the inlet 201 of the first poppet 200 decreases, the spool 500 may be moved in a direction of the inlet 201 by a restoring force of the spring 303 which will be described later. In this instance, as the length of the bellows 400 decreases, the inflow hole 302 may be reopened by the spool 500, whereby the amount of the fluid flowing out through the outlet 301 may be maintained to be constant.

In particular, when the pressure of the fluid flowing in through the inlet 201 of the first poppet decreases, the spool 500 may slide to an original position by the elasticity of the spring 303. That is, the area of the inflow hole 302 of the second poppet 300 may increase. Accordingly, a constant amount of the fluid may flow through the flow control valve 2.

The minute flow path 204 in the pressure sensing pole 203 may generate a damping force to prevent the spool 500 from vibrating. In addition, the damping force may be controlled by adjusting a length of the pressure sensing pole 203.

Despite a rapid change in the pressure at an entrance or exit of the flow control valve 2, the spool 500 may adjust the area of the inflow hole 302 of the second poppet 300, thereby maintaining a desired amount of the fluid to be constant.

According to exemplary embodiments of the present invention, a flow control valve may be manufactured and processed with relative ease.

In addition, a relatively light sleeve may be moved to adjust an area of a flow path, whereby a force used to drive a flow control valve may be reduced remarkably. Accordingly, a size of an actuator may be reduced and thus, a weight of the flow control valve may also be remarkably reduced.

In addition, a flow may be controlled precisely using a direct current (DC) motor type actuator.

In addition, a flow may be controlled to be maintained constant despite a rapid change in a pressure at an entrance and exit of a flow control valve.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A flow control valve, comprising:
a valve body including a flow path;
a first poppet fixed in the valve body, the first poppet including an inlet through which a fluid flows in, and an outflow hole through which the fluid flows out to the flow path;
a second poppet fixed in the valve body, the second poppet including an outlet through which the fluid flows out, and an inflow hole through which the fluid flows in from the flow path;
a sleeve and an actuator to adjust an area of the outflow hole by covering the outflow hole while sliding along an external surface of the first poppet;
a spool formed to slide solely along an external surface of the second poppet, the spool being elastically supported by the second poppet; and
bellows coupled with the first poppet and the spool, the bellows expanding and contracting based on a change in an internal or external pressure,
wherein
the spool adjusts an area of the inflow hole by covering the inflow hole while sliding when the bellows expands and contracts.

2. The flow control valve of claim 1, wherein
a first chamber is formed in an internal portion of the bellows to be in pressure communication with the inlet through a pressure sensing pole, and a minute flow path is formed to transfer pressure from the inlet to the first chamber via the pressure sensing pole.

3. The flow control valve of claim 2, wherein the minute flow path is formed in a pressure transferring portion to protrude on the other side of the first poppet.

4. The flow control valve of claim 1, wherein a second chamber is formed between the second poppet and the spool, and a spring is formed in an internal portion of the second chamber to elastically support the spool, and a hole is formed in the spool to enable pressure communication between the second chamber and the flow path of the valve body.

5. The flow control valve of claim 1, wherein a rack gear is installed on a surface of the sleeve, and the actuator corresponds to a pinion gear that is rotated by a driving portion while the pinion is engaged with the rack gear.

* * * * *